United States Patent
Pike

[11] 3,823,373
[45] July 9, 1974

[54] PROVING CIRCUITS FOR VEHICLE WHEEL SPIN OR SLIDE CORRECTION APPARATUS

[75] Inventor: Peter P. Pike, London, England

[73] Assignee: Westinghouse Brake and Signal Company Limited, London, England

[22] Filed: Feb. 22, 1972

[21] Appl. No.: 227,761

Related U.S. Application Data

[63] Continuation-in-part of Ser. No. 21,272, March 20, 1970, abandoned.

[52] U.S. Cl. .................. 324/73 R, 331/111
[51] Int. Cl. .................. G01r 31/00, H03k 3/26
[58] Field of Search ........ 331/111; 324/57, 73, 158; 303/21 EB, 21 CG, 21 AF; 340/410; 235/150.2, 150.22

[56] References Cited
UNITED STATES PATENTS
3,341,840  9/1967  Berkheiser .................. 331/111 X
3,629,695  12/1971  Taylor et al. .................. 324/57 R

OTHER PUBLICATIONS
R. Ferrie, "Unijunction Circuit Generates Specific Number of Pulses," Electronics, May 4, 1964, pg. 78.

Primary Examiner—Alfred E. Smith
Assistant Examiner—Rolf Hille
Attorney, Agent, or Firm—Larson, Taylor & Hinds

[57] ABSTRACT

A proving circuit for an apparatus for correcting vehicle wheel spin or slide includes an oscillator for generating a first output signal the frequency of which varies over a given range in accordance with a first rate of change law and a second signal which varies over a given range of frequencies in accordance with a second rate of change law, the rate of change laws being such that when the signals are applied to the apparatus as a simulated rate of change of velocity signal the correct operation of the apparatus is initiated by one of the signals but not by the other. The output of the proving circuit is magnetically coupled to the pick-up coil of the wheel speed detector of the apparatus so that the detector and pre-amplifier which form the input to the apparatus are proved as well.

8 Claims, 4 Drawing Figures

PROVING CIRCUITS FOR VEHICLE WHEEL SPIN OR SLIDE CORRECTION APPARATUS

CROSS REFERENCE

This application is a Continuation-in-Part of U.S. application Ser. No. 21,272, filed on Mar. 20, 1970, now abandoned.

FIELD OF THE INVENTION

This invention relates to a circuit for proving operation of apparatus for correcting spin or slide of vehicle wheels.

BACKGROUND OF THE INVENTION

In copending U.S. application Ser. No. 793,141, U.S. Pat. No. 3,584,921, there is described apparatus for controlling braking and/or tractive forces on a wheeled vehicle including means for deriving a speed signal representative of the peripheral velocity of a wheel of the vehicle, a signal representing the rate of change of peripheral speed of said wheel and a modifying circuit responsive to a value of said latter signal, representing an excessive rate of change of peripheral velocity, to produce a modification signal operable to cause appropriate modification to tractive or braking forces of the wheel to tend to reduce spinning or sliding of the wheel as the case may be, and including means for comparing said speed signal with an independently varying signal carried by a storage device in an electrical time constant circuit, the modifying circuit being responsive to attainment of a predetermined relationship between the speed signal and the independently varying signal to initiate at least partial removal of the modification in advance of full adhesion being regained.

An even earlier form of apparatus for correcting for spin or slide of vehicle wheels is described in British Pat. No. 983,869.

The apparatus described in the patent application mentioned above has built into it one or more reference levels of rate of change of peripheral speed of a wheel, attainment of which, under acceleration or deceleration, is regarded as an indication of an excessive rate of change of speed, and it is desirable for testing such apparatus to be able to readily simulate the rate of change while the vehicle is stationary.

SUMMARY OF THE INVENTION

According to the present invention, there is provided a circuit for proving operation of apparatus for correcting spin or slide of a vehicle wheel including oscillator means operable to generate an output signal frequency and to cause the output signal frequency to vary in a predetermined manner to simulate at least one rate of change of frequency to which the apparatus, when operating, is required to react in predetermined manner.

A preferred aspect of the invention provides a circuit for proving the operation of an apparatus for correcting spin or slide of a vehicle wheel including oscillator means operable in turn to generate a first output signal the frequency of which varies over a given range in accordance with a first rate of change law and a second signal which varies over a given range of frequencies in accordance with a second rate of change law, said laws being such that when the signals are applied to the apparatus as simulated rate of change of velocity signals the correct operation of the apparatus is initiated by one said signal but not by the other.

The apparatus for correcting spin or slide is of type which includes a ferrous toothed wheel which rotates with the axle or vehicle wheel spining or sliding of which is to be detected, as well as a magnetic pick-up for producing an output corresponding to the rotational speed of the toothed wheel and hence of the axle in question. By coupling the pick-up, and the pre-amplifier associated therewith, to the proving circuit through a further winding or coil connected to the output of that circuit, the whole of the apparatus, apart from the toothed wheel, can be proved and, in particular, in addition to proving the spin or slip correcting apparatus, any defects in the pick-up or pre-amplifier can be detected.

BRIEF DESCRIPTION OF THE DRAWINGS

In order that the present invention may be more clearly understood and readily carried into effect, the same will be further described by way of example with reference to the accompanying drawings in which.

DETAILED DESCRIPTION OF A PREFERRED EMBODIMENT

Figure 1:
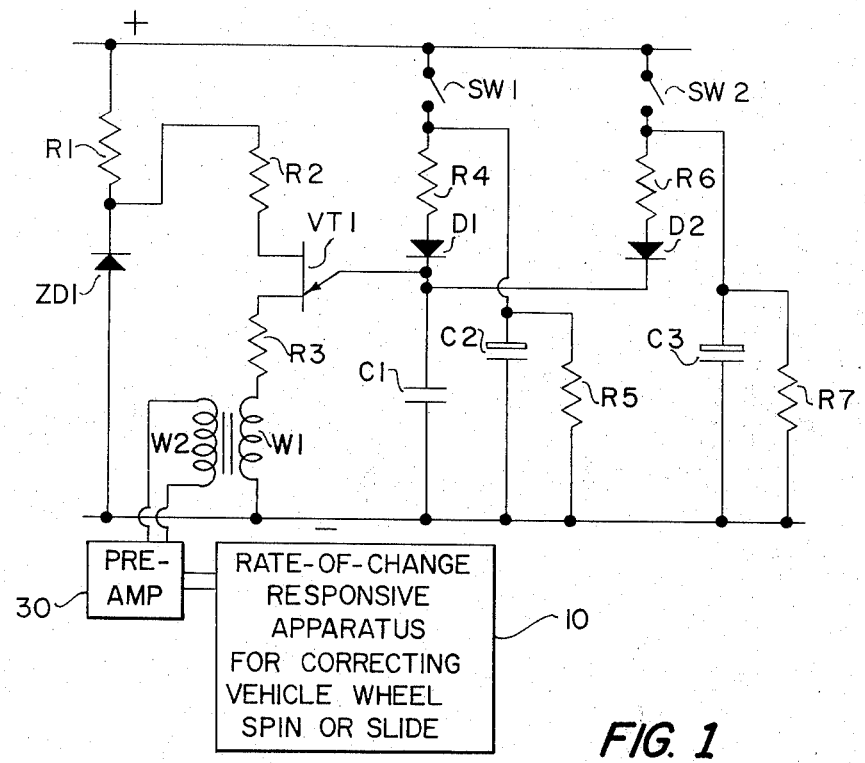
FIG. 1 illustrates an oscillator for use in a circuit according to the invention.

Referring to FIG. 1, the oscillator is based on a unijunction transistor VT1 the first base of which is connected via a resistor R2 to the junction of a resistory R1 and a zener diode ZD1. R1 and ZD1 are connected across positive and negative supply lines for the circuit which may, for example, be capable of providing a supply of 30 volts. The second base of the unijunction transistor VT1 is connected via a resistor R3 and a winding W1 of a test device which in the present example of the invention is assumed to be coupled via a secondary winding W2 to a wheel generator described below which is arranged to produce a signal the frequency of which is proportional to the peripheral velocity of a wheel or axle of a vehicle.

In FIG. 1, the output of secondary winding W2 is shown connected through a pre-amplifier 30 to a rate-of-change responsive apparatus 10 for correcting vehicle wheel spin or slide so that, as described below, a spin or slide signal can be simulated to prove or test the apparatus 10. As stated, the apparatus 10 is preferably of the type disclosed in copending U.S. application Ser. No. 793,141.

The emitter electrode of the unijunction transistor VT1 is connected to the junction of a diode D1 and a capacitor C1, the other side of the diode D1 being connected via a resistor R4 to one contact of a switch SW1. The series arrangement of SW1, R4, D1 and C1 is connected across the aforementioned supply lines and a capacitor C2 is connected across the series arrangement of R4, D1 and C1, C2 having a discharging resistor R5 connected across it. A similar arrangement of a switch SW2, resistor R6, diode D2 is connected also to the emitter electrode of the unijunction transistor VT1 and a capacitor C3 is connected across the series arrangement of R6, D2 and C1, C3 having in parallel with it a discharging resistor R7.

Figure 3:
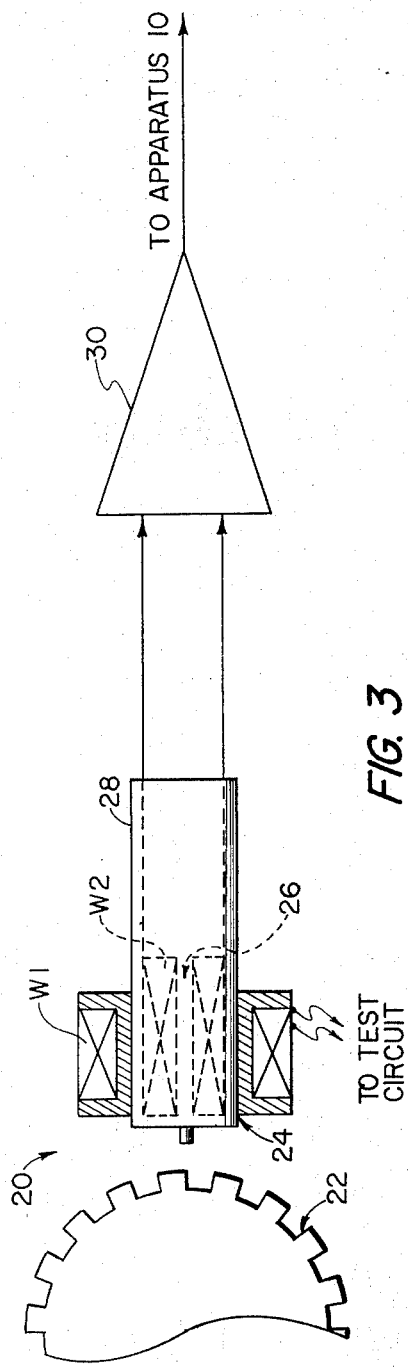
FIG. 3 illustrates the axle speed detection apparatus which forms the input of the speed responsive apparatus of FIG. 1.
Figure 4:
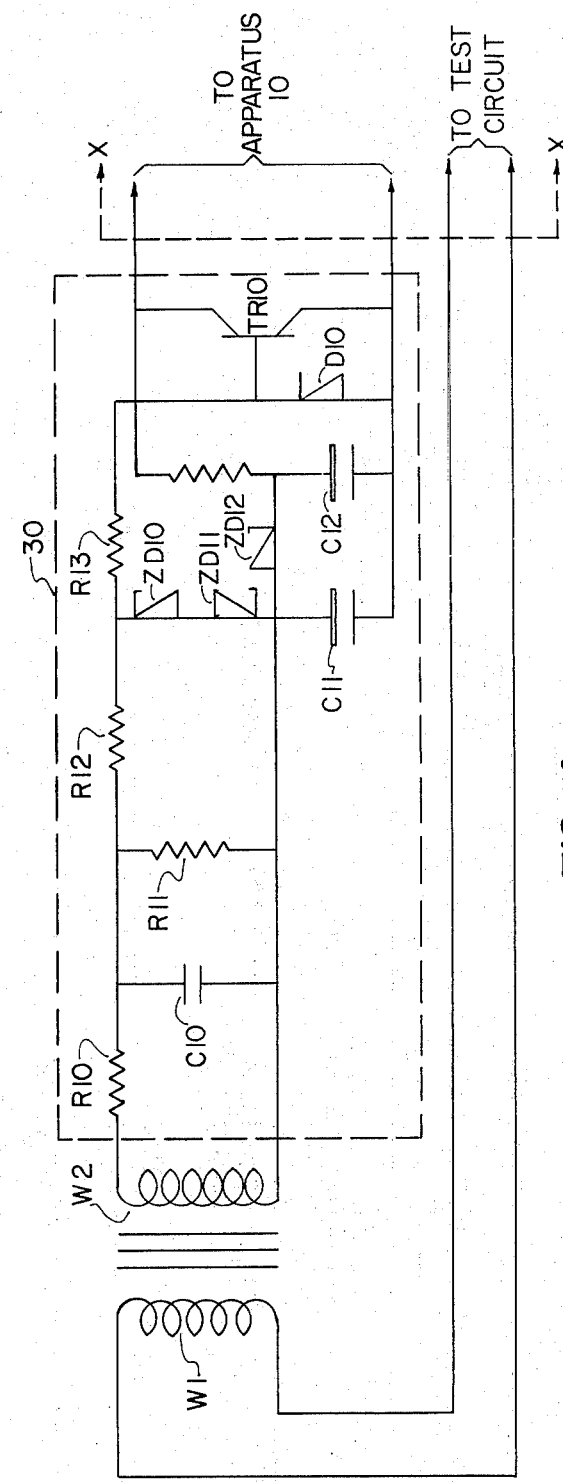
FIG. 4 illustrates the electrical circuitry of the apparatus of FIG. 3.

Referring to FIGS. 3 and 4, a rate-of-change generator or detector is shown which is generally denoted 20 (see FIG. 3) and which forms the input to apparatus 10. Wheel speed generator 20 includes a ferrous toothed wheel 22 (FIG. 3) which rotates with the axle or vehicle wheel spinning or sliding of which is to be detected. Associated with wheel 22 is a pick-up device 24 which includes a bar magnet 26 about which a pick-up coil or winding W2 (shown in dashed lines in FIG. 3) is wound. Pick-up coil W2 is connected to pre-amplifier 30, the output of which is applied to the spin or slide control apparatus 10 as above indicated. The wheel speed or rate of change generator thus far described is conventional and, in operation, rotation of toothed wheel 22 varies the flux linkage with coil as the teeth thereof pass by bar magnet 26. This enables the pick-up device 24 to detect variations in the rate of change of the rotational frequency of the wheel, that is, acceleration or deceleration, which are greater than normal such as to indicate spin or slide. These signals are utilized by apparatus 10 which provides the necessary acceleration or deceleration forces to the vehicle wheel.

Pre-amplifier 30 is, as stated, connected to the output of pick-up coil W2 and, in the exemplary embodiment shown in FIG. 4, includes a filter made up of a series resistor R10 and a shunt capacitor C10 for eliminating undesired stray high frequency signals. A resistory R11 serves as a leakage resistor for capacitor C10 and the input signal after passing through a further resistor R12 is voltage limited by zener diodes ZD10 and ZD 11. A further zener diode ZD12, together with a capacitor C12 and a resistor R14, affords a voltage input level to a transistor TR10 which is about half of the supply voltage rail to which the collector of TR10 is connected via a 5K resistor (not shown) in the circuit of apparatus 10. A resistor R13 limits the current reaching the base of transistor TR10 and a diode D10 limits the negative voltage on the base of transistor TR10 to about 0.5 volts.

In accordance with one important aspect of the invention winding W1 referred to above is wound onto the pick-up head 28 of pick-up device 24 so as to be magnetically coupled to pick-up coil W2. Hence, when the vehicle is stationary, there will be no variation in the flux linked with the inner pick-up coil W2 due to movement of toothed wheel 22 but a simulation signal in the outer coil W1 provided by the test circuit of FIG. 1 can be, by transformer action, coupled to the pick-up coil W2 and hence applied to the pre-amplifier 30 and rate-of-change responsive apparatus 10 to prove the operation of this overall system. It will be appreciated that by applying the test signal in this manner to pick-up coil W2 of the pick-up device 24 the entire detection and correction system with the exception of the toothed wheel 22 and magnet 26 is proven or calibrated. It is noted pick-up coils corresponding to coil W2 are frequently mounted in a position such that they are not readily accessible to a technician for the purpose of injecting a test signal and hence the invention provides an advantage in this regard as well.

In operation of the test circuit arrangement of FIG. 1, as described, the winding W1 is magnetically coupled to the pick-up coil W2 of the wheel generator 20 of the spin or slide detection apparatus 10, the wheel generator 20 providing signals to the spin or slide detection apparatus 10 and the latter being responsive to a predetermined rate of change of peripheral wheel speed to initiate modification of the braking or tractive forces giving rise to such a rate of change. While the vehicle upon which the apparatus 10 is installed is stationary, a technician can operate the switches SW1 or SW2 to provide injection of a varying frequency produced by the oscillator of FIG. 1 into the winding W2 which frequency is thereby transmitted to the apparatus 10 as described above and can initiate operation of the means within apparatus 10 which modifies the braking or tractive forces. Hence, proving of the functioning of the modification part of the apparatus 10 can be achieved.

Figure 2:
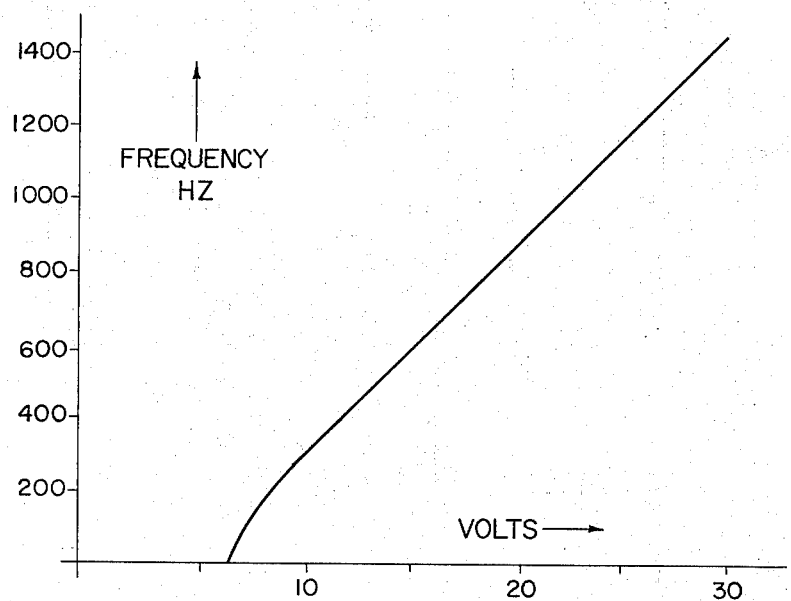
FIG. 2 illustrates a typical frequency characteristic of the oscillator of FIG. 1.

Assuming that switch SW1 is depressed, the capacitor C2 is charged from the supply to the supply voltage and at the same time provides the supply voltage to the resistor R4 and capacitor C1, thereby causing the circuit to oscillate by alternate charging of capacitor C1 via D1 up to a point at which the transistor conducts and discharging of C1 via the emitter and lower base of VT1 into the winding W1. The frequency of the oscillation is initially dependent upon the supply voltage and on release of the switch SW1, the frequency changes at a rate which depends upon the rate of change of voltage applied to the emitter electrode of the unijunction transistor VT1 from the capacitor C2. This in turn is dependent upon the rate of discharge of C2 via the resistor R5 and a typical frequency against voltage law for the oscillator is shown in the graphical illustration of voltage against frequency in FIG. 2. The value of the resistor R5 can be chosen to give rise to a maximum rate of change of voltage after release of the switch SW1 corresponding to the minimum rate of change of speed of the wheel to which the apparatus 10 is to be responsive.

Referring now to the part of the circuit associated with the switch SW1, on operation of the switch SW2 a similar mode of operation occurs but the capacitor C3 is arranged to discharge via R7 at a slightly lower rate and the value of R7 can be chosen such that the rate of change of frequency is a rate which corresponds to a rate of change of speed of the vehicle wheel to which the apparatus is not required to respond. Hence, the switches SW1 and SW2 operated in turn are required in respect of SW1, to trigger the modification circuit and in the case of SW2, to not trigger the modification circuit. In the event of these requirements not being fulfilled, a certain degree of drift in the functioning of the modification and sensing apparatus for detecting the rate of change of speed has occurred and suitable adjustments are required.

The circuit arrangement of FIG. 1 provides for reproduction of circumstances which occur under braking conditions of a vehicle wheel, that is it reproduces rates of change of frequency by decrease of frequency corresponding to decrease of wheel speed. In the event of the circuit being required to be operated to provide reproduction of circumstances which can occur under traction conditions as will be the case where wheel spin detection is to be effected, slight circuit modifications can be made. In this case, the resistor R5 is reintroduced between the switch SW1 and resistor R4 and the resistor R7 is reintroduced between SW2 and R6 in order that increasing frequency with time can be provided by operation of SW1 and SW2. It will be appreciated that instead of being virtually instantaneous, the charging of C2 or C3 as the case may be is timed by the respective resistor R5 or R6 while the switch SW1 or SW2 is held closed.

From the patent application referred to in the foregoing and to which the apparatus described in the above described embodiment of the present invention is suitable for application, it will be appreciated that for each apparatus for controlling the braking and/or tractive forces on a wheeled vehicle there may be provided associated therewith an arrangement including an oscillator circuit such as described in the aforementioned FIG. 1 and for the purpose of routine checking of the apparatus, a designated technician can operate the switches SW1 and SW2 in turn and observe the effect thereof upon the modifying circuit arrangements of the apparatus. Such observations may be made either by audibly observing the blowing down of brakes or alternatively by the provision of visible indications such as lights, operated by the modifying circuit.

While the present invention has been described with reference to specific embodiments based on a circuit as illustrated in FIG. 1, modifications and adaptations of the invention may readily be apparent to persons skilled in the art. For example, one of the capacitors C1 and C3 may if desired, be dispensed with in a variation of the circuits by arranging for a range of time constants to be available by selective operation of circuits associated with only one such capacitor.

What is claimed is:

1. A circuit for proving the operation of an apparatus for correcting spin or slide of a vehicle wheel, said apparatus being of the type which includes a wheel speed generator including a magnetic field responsive pick-up and a pre-amplifier connected to output of the pick-up, said circuit comprising oscillator means for generating in turn, a first output signal the frequency of which varies over a given range in accordance with a first rate of change law and a second signal which varies over a given range of frequencies in accordance with a second rate of change law, said laws being such that when the signals are applied to the apparatus as simulated rate of change of velocity signal the correct operation of the apparatus is initiated by one said signal but not by the other, said circuit further including an output winding for magnetically coupling the output of the circuit to the pick-up of the wheel speed generator so that the entire apparatus including the pick-up and pre-amplifier is proved.

2. A circuit as claimed in claim 1 wherein the oscillator means includes an input control voltage dependent oscillator.

3. A circuit as claimed in claim 2 further including means operable after initiation of said control voltage for producing a rate of change of the control voltage with time which is substantially constant over a portion of the duration thereof.

4. A circuit as claimed in claim 3 wherein the control voltage is supplied by a capacitor with a leak resistor connected thereacross, the capacitor being chargeable to a predetermined voltage on said initiation.

5. A circuit as claimed in claim 3 wherein the control voltage is supplied by a capacitor chargeable via a resistor following said initiation to give an increase of control voltage towards a predetermined value with time.

6. A circuit as claimed in claim 4 wherein a different circuit means is provided for supplying the control voltages for giving rise to the first and second signals.

7. A circuit as claimed in claim 2 wherein the oscillator includes a unijunction transistor to the bases of which in operation a predetermined supply voltage is applied, control voltage being applied through a resistor to charge a capacitor between one said base and the emitter thereof.

8. A circuit as claimed in claim 1 wherein said first rate of change law simulates a rate of change of velocity indicative of vehicle wheel slip or slide and said second rate of change law simulates a rate of change of velocity which is within acceptable limits for vehicle wheel rate of change.

* * * * *